United States Patent [19]

Eppich

[11] 4,147,007
[45] Apr. 3, 1979

[54] MATABLE MODULAR ELEMENTS FOR TOY, DISPLAY AND MODEL APPLICATIONS UTILIZING PAIRED RIB STRUCTURE

[75] Inventor: Helmut Eppich, West Vancouver, Canada

[73] Assignee: Ebco Industries, Ltd., Richmond, Canada

[21] Appl. No.: 749,345

[22] Filed: Dec. 10, 1976

[51] Int. Cl.² .......................... E04B 2/08; G09B 25/04
[52] U.S. Cl. ........................................ 52/570; 35/53; 46/25; 46/30; 52/284
[58] Field of Search ............... 52/570, 590, 586, 591, 52/284; 35/16, 53, 25, 35; 46/25, 21, 28, 30; 24/201 C

[56] References Cited

U.S. PATENT DOCUMENTS

| | | | |
|---|---|---|---|
| 1,381,823 | 6/1921 | Griffin | 52/570 |
| 2,132,757 | 10/1938 | Paulson | 46/25 |
| 2,988,844 | 6/1961 | Frimberger | 46/30 |
| 3,119,154 | 1/1964 | Moore | 52/586 |
| 3,557,413 | 1/1971 | Engle | 24/201 C |
| 3,586,220 | 6/1971 | Reinsberg | 24/201 C |
| 3,686,810 | 8/1972 | Allen | 52/243 |

FOREIGN PATENT DOCUMENTS

| | | | |
|---|---|---|---|
| 536204 | 2/1922 | France | 52/570 |
| 1311988 | 11/1962 | France | 52/282 |
| 1578821 | 7/1969 | France | 46/25 |

Primary Examiner—John E. Murtagh
Attorney, Agent, or Firm—Christensen, O'Connor, Johnson & Kindness

[57] ABSTRACT

A modular element is disclosed which includes a plurality of rib pairs protruding from a surface of a base. Each rib pair includes first and second ribs which extend longitudinally parallel to each other and which are transversely spaced to define therebetween a first groove. Similarly, the rib pairs also longitudinally extend parallel to each other with adjacent rib pairs defining therebetween a second groove. Various relationships among the transverse widths of the first and second ribs, the rib pairs, and the first and second grooves are disclosed to permit mating modular elements to have a plurality of orientations with respect to each other in face-to-face contact. Likewise, relationships among the transverse height of the base, and the transverse height of the modular element, and the transverse widths of the first and second ribs, rib pairs, and first and second grooves are also disclosed to permit mating modular elements to have a plurality of orientations in end-to-face contact. Intermediate and interconnecting elements for such matable modular elements are also disclosed, as are a plurality of rib designs providing for either a disconnectable fit, a semi-permanent locking fit, or a permanent locking fit of mating modular elements.

48 Claims, 20 Drawing Figures

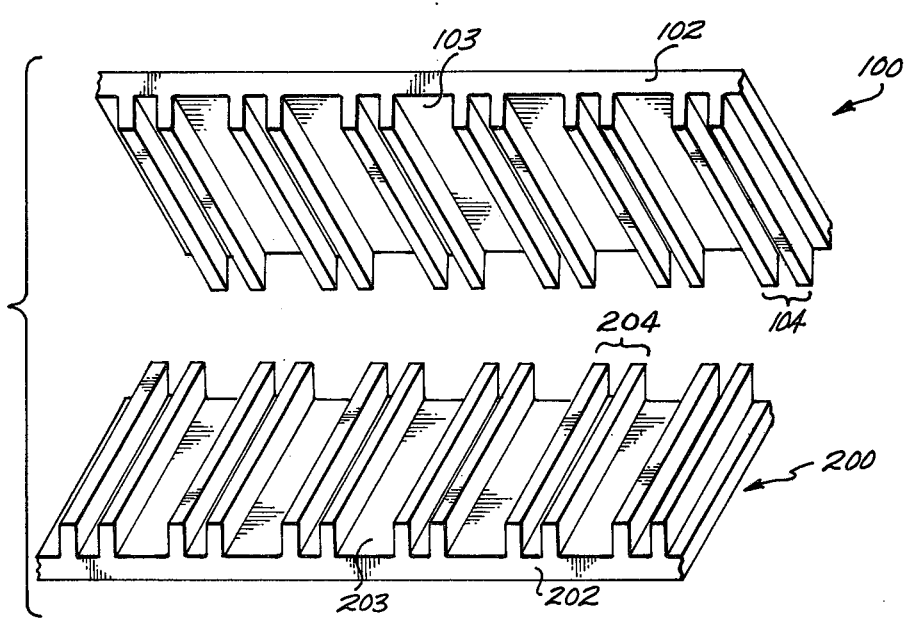
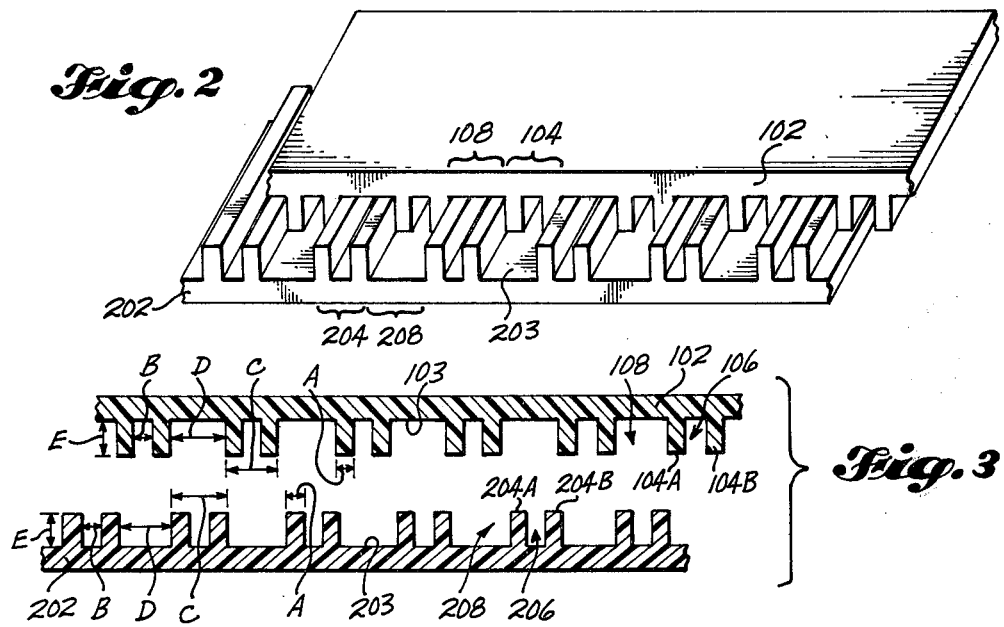
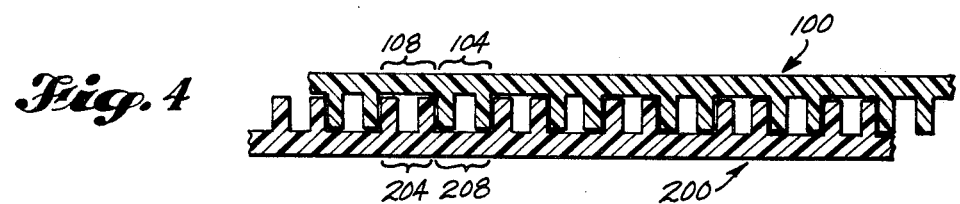
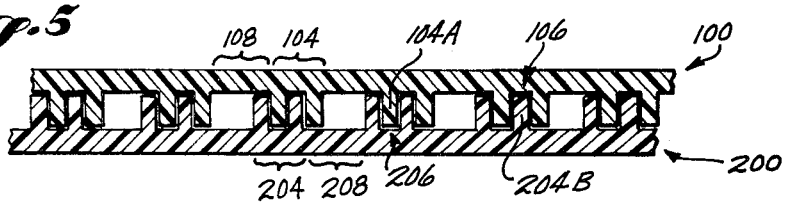

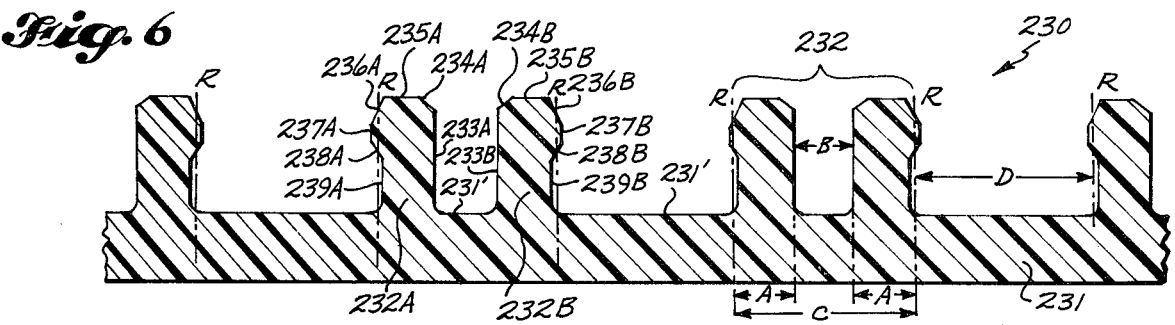
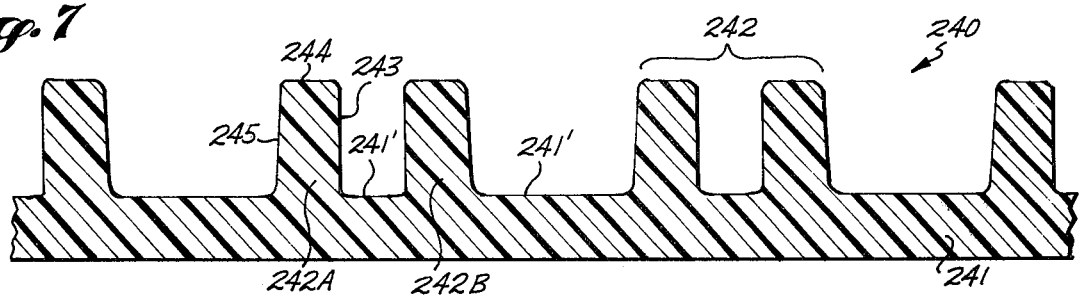
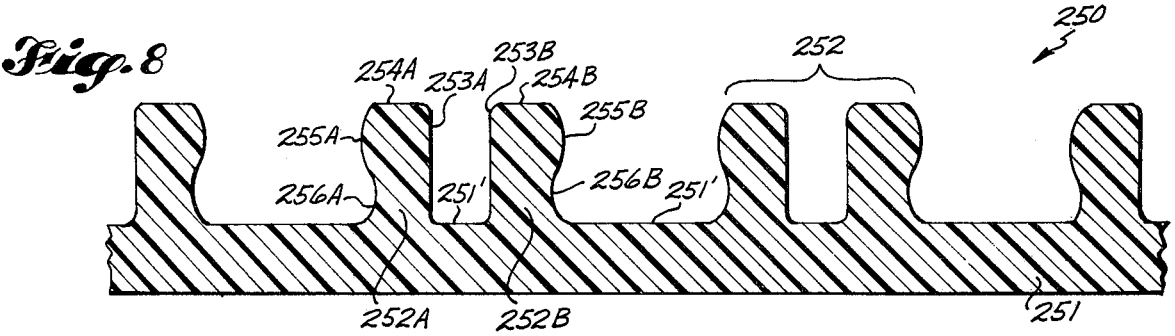
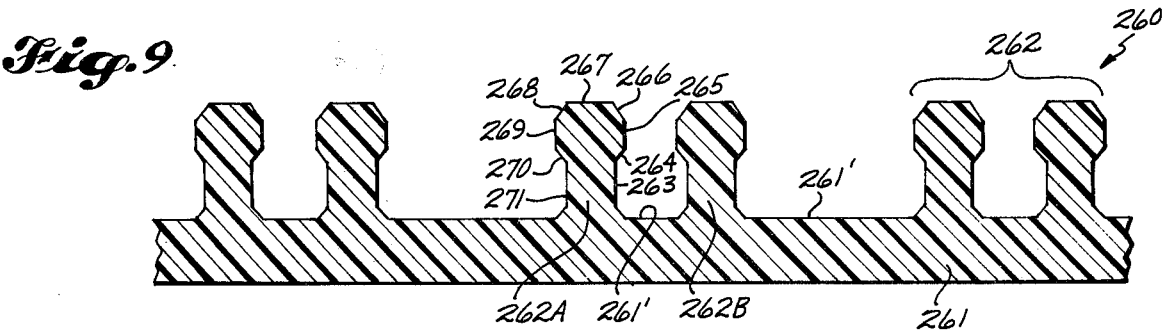
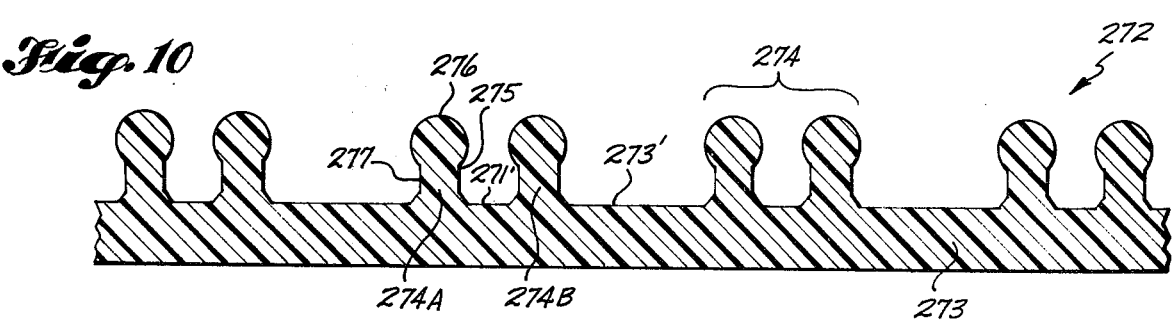

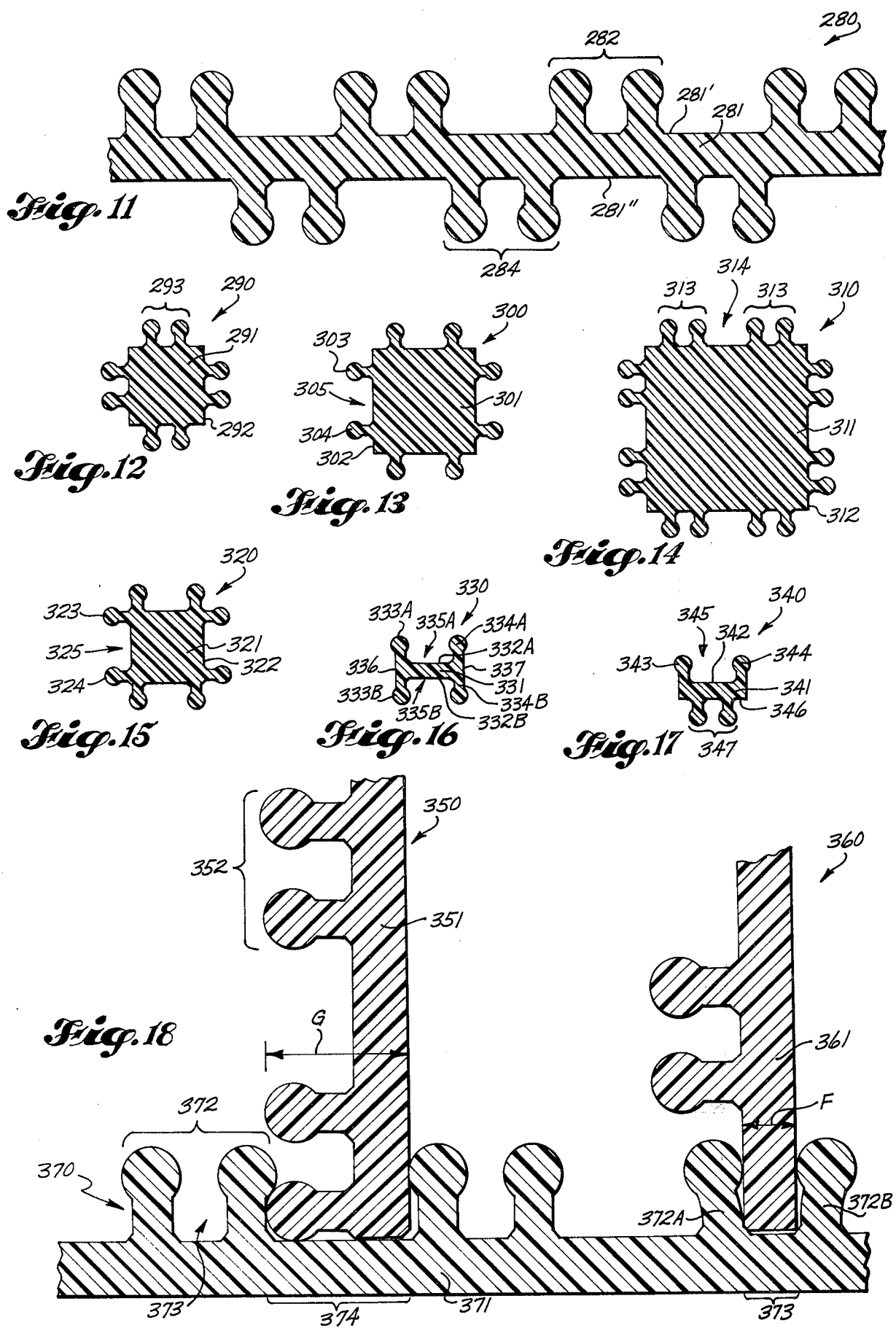

MATABLE MODULAR ELEMENTS FOR TOY, DISPLAY AND MODEL APPLICATIONS UTILIZING PAIRED RIB STRUCTURE

FIELD OF THE INVENTION

This invention generally relates to modular elements which can be mated to form toys, graphic displays, and models of various types of structures.

BACKGROUND OF THE INVENTION

The prior art teaches modular elements which can be mated together to provide three-dimensional graphic display boards for displaying information relating to planning, scheduling, and the like. A substantially planar base member has a repetitive male pattern on one surface thereof, which male pattern may comprise a plurality of raised, equi-distant, equi-dimensioned blocks. Display elements are provided, each of which has a repetitive female pattern on a planar surface thereof complementary to the repetitive male pattern of the base member. The display elements may be formed in rectangular, triangular, circular or other shapes. A desired graphic display is then formed by a user pressing selected display elements on the base member whereupon the display elements are retained in position by frictional engagement between their female patterns and the male pattern of the base member.

Yet another application of such modular elements in the prior art is in the construction of toys and three-dimensional models. In such cases, the modular elements are typically non-planar and shaped in the form of conventional bricks, cement blocks, or the like. In addition, these modular elements have, on a second surface, a repetitive male pattern of raised blocks cylinders or the like to allow stacking. Accordingly, a toy or scale model structure can be constructed by utilizing a plurality of the modular elements.

Due to the intricate nature of the male and female patterns of the prior art modular elements, each element is typically molded from a plastic material by an injection molding process. As a result, the prior art modular elements are quite expensive, particularly in applications where a large number of such elements are required.

It is also known in the prior art to form such modular elements from a plastic material by the use of relatively inexpensive extrusion molding process, in which case the resultant modular elements include a plurality of longitudinally-extending ribs which are equi-distantly spaced from each other in a transverse direction to define a corresponding plurality of grooves. Mating of the elements is then accomplished by respective frictional engagement of the ribs and grooves in first and second elements when brought into mating, face-to-face contact. Although inexpensive, this type of modular element is disadvantageous in only permitting a single face-to-face orientation of the mating elements as contrasted with the injection molded elements which can be assembled with many orientations.

It is therefore an object of this invention to provide matable, modular elements which can be manufactured by relatively inexpensive extrusion molding processes.

It is a further object of this invention to provide such matable, modular elements which permit such elements in assembly to have a plurality of orientations with respect to each other when mated in face-to-face contact.

It is yet a further object of this invention to provide such matable, modular elements which allow mating of such elements with a disconnectable fit, or with a semipermanent locking fit, or with a permanent locking fit.

It is another object of this invention to provide such matable, modular elements in a plurality of forms, such as base elements, intermediate elements, interconnecting elements, and the like, all of which can be produced by extrusion molding and all of which are particularly useful in toy and model applications.

SUMMARY OF THE INVENTION

Briefly, these objects and others that will be apparent to those skilled in the art are achieved by a matable modular element for use in constructing toys, grphic displays and structural models wherein the matable modular element comprises a base having a base surface and a plurality of parallel rib pairs protruding from the base surface. Each of the rib pairs includes first and second, parallel ribs which extend longitudinally along the base surface and which are transversely spaced from each other to define a first groove therebetween. The plurality of rib pairs are also transversely spaced from each other with adjoining ones of the plurality of rib pairs defining therebetween a second groove.

In a preferred embodiment, each of the first and second ribs has a width A in a direction transverse to the longitudinal extension thereof. Each first groove has a transverse width B, wherein B is substantially equal to $nA$ wherein $n$ equals 1, 2, 3, . . . . Each rib pair has a transverse width C, where C is substantially equal to $(2+n)A$. Finally, each second groove has a transverse width D, where D is substantially equal to C.

The invention also resides in a modular element for use in interconnecting a plurality of such matable modular elements. Such a modular element includes a body with a plurality of exterior surfaces. In one embodiment, such a modular element includes at least one rib pair protruding from each of the exterior surfaces with each such protruding rib pair being identical in configuration to the rib pairs protruding from the base surfaces of the matable modular element.

In another embodiment, such a modular element includes a body having a plurality of exterior surfaces, with third and fourth ribs protruding from each of the exterior surfaces. Each third and each fourth rib is identical in configuration to the ribs of the rib pairs protruding from the base surfaces of the matable modular elements, and the third and fourth ribs are transversely spaced from each other to define therebetween a third groove substantially identical in configuration to the second grooves between the rib pairs protruding from the base surfaces of the matable modular elements.

In yet another embodiment, such a mudular element comprises a body having a plurality of exterior surfaces, each of the plurality of exterior surfaces being substantially planar. Third and fourth ribs protrude from each of opposing first and second ones of the plurality of exterior surfaces, with each third and each fourth rib being identical in configuration to the ribs of the rib pairs protruding from the base surfaces of the matable modular elements and being transversely spaced from each other to define therebetween a third groove substantially identical in configuration to the second grooves between the rib pairs of the protruding from the base surfaces of the matable modular elements.

In still another embodiment, such a modular element comprises a body having a plurality of exterior surfaces, each of the plurality of exterior surfaces being substantially planar. At least one rib pair protrudes from one of the plurality of exterior surfaces and third and fourth ribs protrude from a second one of a plurality of exterior surfaces, the rib pair and the third and fourth ribs being similar in configuration and in spacing to those previously described.

Each matable modular element may be configured so that each first and each second rib has a lower, indented portion adjacent to the base surface and an upper, expanded portion, integral with the lower, indented portion, for providing an interlocking fit upon mating of first and second matable modular elements.

In yet another embodiment, the matable modular element may be configured so that each second rib includes a lower recess facing the second groove and adjoining the base surface, and an upper projection facing the second groove and adjoining the lower recess to provide an interlocking fit between first and second matable modular elements.

Each element may be configured so that each first and each second rib has a first side surface extending from and adjoining a base surface and facing the second groove, a second side surface extending from and adjoining the base surface and facing the first groove, and a top surface adjoining the first and second side surfaces, each of the first and the second side surfaces being substantially planar, with the second side surface being substantially perpendicular to the base surface and the first side surface being slightly inclined from a perpendicular to the base surface to provide a disconnectable fit between first and second matable modular elements.

BRIEF DESCRIPTION OF THE DRAWINGS

The invention can perhaps best be understood by reference to the following portion of the specification, taken in conjunction with the accompanying drawings in which:

FIG. 1 is an exploded pictorial view showing first and second modular elements constructed according to the teachings of the present invention;

FIG. 2 is a pictorial view showing the first and second modular elements in assembly with a first orientation;

FIG. 3 is a cross-sectional view of the first and second modular elements;

FIG. 4 is a cross-sectional view of the first and second modular elements in assembly with the first orientation and generally corresponding to FIG. 2;

FIG. 5 is a cross-sectional view of the first and second modular elements in assembly with a second orientation;

FIG. 6 is a cross-sectional view of a first rib design for a modular element of the present invention and allowing a semi-permanent locking fit;

FIG. 7 is a cross-sectional view of a second rib design for a modular element and allowing a disconnectable fit;

FIG. 8 is a cross-sectional view of a third rib design for a modular element and allowing a semi-permanent locking fit;

FIG. 9 is a cross-sectional view of a fourth rib design for a modular element and allowing a semi-permanent locking fit;

FIG. 10 is a cross-sectional view of a fifth rib design for a modular element and allowing a semi-permanent locking fit;

FIG. 11 is a cross-sectional view of the fifth rib design as applied to a modular element usable as an intermediate element;

FIGS. 12-17 are cross-sectional views of various modular elements used as interconnecting elements and having the fifth rib design;

FIG. 18 is a cross-sectional view illustrating third and fourth orientations of the modular elements in assembly;

DESCRIPTION OF THE PREFERRED EMBODIMENTS

Figure 19:
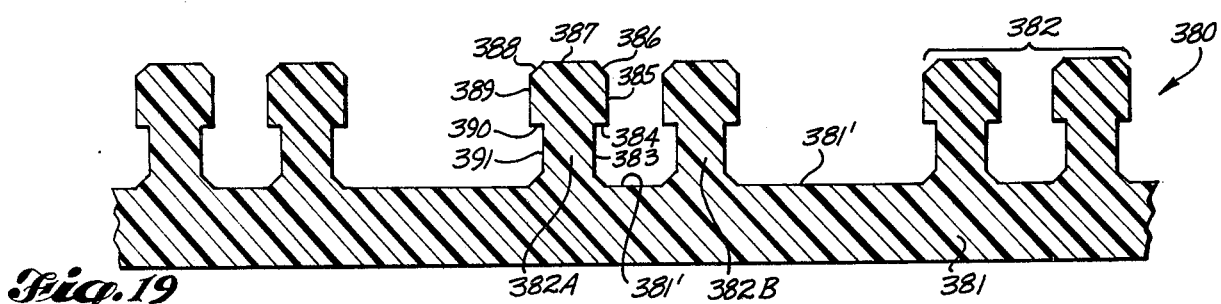
FIG. 19 is a cross-sectional view illustrating a sixth rib design for a modular element and allowing a permanent locking fit.

With reference now to FIGS. 1-3, first and second modular elements 100, 200 include respective bases 102, 202 having substantially planar surfaces 103, 203 from which extend a plurality of integral rib pairs 104, 204. Each rib pair 104, 204 includes first and second ribs 104A, 104B, and 204A, 204B, respectively, with each rib being parallel to each other rib and extending longitudinally along each respective base.

Within each rib pair 104, 204, the ribs are separated to define therebtween a longitudinally-extending groove 106, 206. Likewise, adjacent rib pairs 104, 204 define between themselves a longitudinally-extending groove 108, 208.

With respect to the embodiment illustrated in FIGS. 1-5, each of the ribs 104A, 104B, 204A, 204B has a width A in a direction transverse to the longitudinal dimension thereof. Likewise, each groove 106, 206 has a transverse width B, each rib pair 104, 204 has a transverse width C, and each groove 108, 208 has a transverse width D.

Generally, the transverse width B is equal to $nA$, where $n$ equals 1, 2, 3 . . . . The transverse width C is equal to $(2+n)A$, and the transverse width D is equal to the transverse width C. In the preferred embodiment of the invention illustrated in the drawings, $n=1$ so that $B=A$, $C=3A$, and $D=3A$. Finally, each of the ribs 104A, 104B, 204A, 204B has a height E with respect to a common reference plane such as that afforded by surfaces 103, 203.

Construction of the first and second modular elements 100, 200 as described therefore allows a number of orientations of those elements in face-to-face, mating contact. With particular reference to FIGS. 2, and 4, elements 100 and 200 are mated so that the plurality of rib pairs 104 of element 100 are received in corresponding grooves 208 of element 200, and the plurality of rib pairs 204 of element 200 are received in a corresponding plurality of grooves 108 of element 100. In FIG. 5, a second orientation is illustrated wherein the plurality of rib pairs 104 are interengaged with the corresponding plurality of rib pairs 204. In this orientation, respective ribs 104A are received in corresponding grooves 206, and respective ribs 204B are received in corresponding grooves 106. Yet another orientation of the elements 100 and 200 is possible, that being similar to the orientation illustrated in FIG. 5 but with respective ribs 104B being received in corresponding grooves 206 and respective ribs 204A being received in corresponding grooves 106.

Although each of the surfaces 103, 203 is shown in FIGS. 1-5 as being substantially planar, the portion of each surface 103, 203 forming the bottom of each groove 106, 206 may be elevated (or depressed) with respect to the remaining portions of each surface 103, 203 forming the bottom of grooves 108, 208. In such a case, yet another orientation of the elements 100, 200 is possible, with the elements 100, 200 having a first height dimension in assembly when oriented as illustrated in FIG. 4 and a second greater (or lesser) height in assembly when oriented as in FIG. 5.

Those skilled in the art will also recognize that the plurality of rib pairs 104, 204 may form part of bases 102, 202, that have non-planar surfaces 103, 203, such as would be the case where the bases 102, 202 comprise a cylinder. It will also be recognized that the ribs 104, 204 may be applied to more than one surface of a base, such as will be explained in more detail hereinafter with reference to the modular elements illustrated in FIGS. 11-17.

Preferably, each modular element is formed by extrusion molding a plastic material such as ABS plastic or that plastic material sold under the trademark "TEXLON". It is desirable that the plastic material that is chosen have the capability, after molding, of flexing so as to permit easy and positive engagement of the respective rib pairs when first and second modular elements are mated, but yet have the capacity of allowing each rib pair to return to its original shape after disconnection of the first and second modular elements.

Also, it is desirable that, in the actual construction of modular elements according to the present invention, the actual dimensions of the ribs and grooves vary slightly from the aforementioned relationships in accordance with the resiliency of the plastic material used and to provide a tighter (or looser) mating fit.

Referring now to FIGS. 6-20, a number of rib designs are illustrated which are more complex than the simple rectangular ribs illustrated in FIGS. 1-5 but which all incorporate the paired rib structure of the present invention.

In FIG. 6, a modular element 200 includes a base 231 having a substantially planar surface 231' from which extend a plurality of rib pairs 232. Each of the rib pairs 232 includes first and second ribs 232A, 232B which are mirror images in cross section and have respective side surfaces 233A, 233B, first chamfers 234A, 234B, top surfaces 235A, 235B, second chamfers 236A, 236B, side surfaces 237A, 237B, undercut surfaces 238A, 238B, and side surfaces 239A, 239B. Side surfaces 237A and 239A (and 237B and 239B) are transversely spaced from each other to accordingly define a rib projection and rib recess so that the ribs 232A, 232B of each rib pair 232 deflect inwardly each other upon initial face-to-face contact with a second modular element, than snap back upon complete mating of that modular element to provide a locking fit. Chamfers 236A, 236B are accordingly provided to facilitate the initial insertion of the rib pairs of one modular element into the corresponding grooves of the mating modular element and preferably are inclined from respective side surfaces 237A, 237B by an angle of from 30°-45°. Undercut surfaces 238A, 238B are likewise inclined from respective side surfaces 237A, 237B by an angle of from 30°-45° to facilitate withdrawal of the rib pairs of one modular element from the corresponding grooves of the mating modular element upon disassembly thereof. The rib design in FIG. 6 permits only on face-to-face orientation of mating modular elements, inasmuch as the side surfaces 233A, 233B which, together with surfaces 231', define a groove between the ribs 232A, 232B, are planar and accordingly not configured to receive one of the ribs of a mating modular element. However, chamfers 234A, 234B do facilitate the insertion of a second modular element when assembled in an end-to-face contact, as illustrated in FIG. 18 and discussed in more detail hereinafter.

Preferably, the side surfaces 237A and 239A (and 237B and 239B) are equally spaced in a transverse direction from a reference line R, with the width A of each rib being taken between the reference line R and the corresponding side surface 233A (or 233B). In this and in the following embodiments, $n=1$, so that $B=A$, $C=3A$ and is taken between successive reference lines R across each rib pair 232, and $D=3A$ and is taken between successive reference lines R between the rib pairs 232, all as indicated in FIG. 6.

A second rib design suitable for easy connection and disconnection is illustrated in FIG. 7 which shows a modular element 240 including a base 241 having a surface 241' from which extend a plurality of rib pairs 242, each rib pair including first and second ribs 242A, 242B. The ribs 242A, 242B are mirror images in crosssection and each includes an inner side surface 243, a top surface 244, and an outer side surface 245. The inner side surfaces 243 are perpendicular to the surface 241', whereas the outer side surfaces 245 are slightly inclined from such a perpendicular, by an angle of, for example, 3°, so that each rib pair 242 and a corresponding groove between each rib pair 242 are inversely tapered to provide a semi-permanent fit upon assembly of mating modular elements in face-to-face contact. Again, only a single orientation in a face-to-face contact is possible, inasmuch as the groove defined by inner side surfaces 243 and surface 241' is not tapered.

In FIG. 8, a third design is illustrated, again for providing a semi-permanent, locking fit. A modular element 250 includes a base 251 having a surface 251 from which extend a plurality of rib pairs 252, each rib pair including first and second ribs 252A, 252B which are mirror images of each other. The ribs 252A, 252B have respective side surfaces 253A, 253B, top surfaces 254A, 254B, convex side surfaces 255A, 255B, and concave side surfaces 256A, 256B. As will be appreciated, convex side surfaces 255A and 256A (and 255B and 256B) define a rib projection and rib recess similar to the rib projection and rib recess provided by the first design illustrated in FIG. 6.

In FIG. 9, a fourth rib design is illustrated which is substantially similar to the first design illustrated in FIG. 6 but which allows a plurality of orientations of mating modular elements in face-to-face contact. A modular element 260 includes a base 261 having a surface 261' from which extend a plurality of rib pairs 262, each of the rib pairs 262 including first and second, identical ribs 262A, 262B. Each of the ribs 262A, 262B includes an inner side surface 263, an inner undercut surface 264, a side surface 265, a first chamfer 266, a top surface 267, a second chamfer 268, a side surface 269, a second undercut surface 270, and an outer side surface 271. The side surfaces 269 and 271, and 265 and 263, are transversely spaced from each other to accordingly define rib projections and recesses, with chamfers 266, 268 facilitating initial insertion of the rib pairs of a first modular element into corresponding grooves of a second modular element, and with undercut surfaces 264 and 270 facilitating initial withdrawal of the rib pairs from the grooves upon disassembly. Again, chamfers 266 and 268, and undercut surfaces 264 and 270, are inclined from the respective side surfaces 265 and 269 by an angle preferably in the range of 30°–45°. With the rib design of FIG. 9, the three orientations of first and second modular elements in face-to-face contact previously discussed with respect to FIGS. 4 and 5 can be made.

In FIG. 10, a fifth rib design is illustrated which is advantageous over those previously discussed in that a mold for the rib design used in extrusion molding can be quite easily made. A modular element 272 includes a base 273 having a surface 273' from which extend a plurality of rib pairs 274, each rib pair including first and second, identical ribs 274A, 274B. Each rib 274A, 274B has an inner side surface 275, an outer surface 277 and an upper, substantially cylindrical surface 276, with side surfaces 275, 277 extending from surface 271' to surface 276 and defining a lower indented portion and substantially cylindrical surface 276 defining an upper expanded portion. The initial assembly and disassembly of mating modular elements is facilitated by the cylindrical surface 276, with semi-permanent locking of the mating modular elements being afforded by deformation of each upper expanded portion of each rib of one of the mating modular elements and the adjacent lower, indented portions of each rib of the other of the mating modular elements upon assembly.

To this point, the paired rib structure has been discussed as being applied to a single surface of a base. In FIG. 11, which illustrates a rib of the fifth design discussed with respect to FIG. 10, a modular element 280 includes a base 281 having an upper surface 281' and a lower surface 281" from which respectively extend a plurality of rib pairs 282, 284. A modular element such as element 280 in FIG. 11 is accordingly useful in providing an intermediate member in the construction of toys and models, and multi-layered display boards.

In FIGS. 12–17, various types of modular elements usable as interconnecting elements for modular elements constructed according to the teachings of FIG. 10 and 11 are illustrated. In FIG. 12, a modular element 290 includes a base 291 formed as a parallelopiped and having a plurality of orthogonal, exterior surfaces 292. A single rib pair 293 extends from each of the exterior surfaces 292.

In FIG. 13, a modular element 300 includes a base 301 of parallelopiped shape and having a plurality of orthogonal, exterior surfaces 302. Extending from each of the exterior surfaces 302 are a first rib 303 and a second rib 304 which are transversely spaced from each other to define therebetween a groove 305 whose transverse width is substantially equal to the transverse width C of the rib pairs, such as rib pairs 274 in FIG. 10 (and thus equal to the transverse width D of the groove between adjacent rib pairs 274).

In FIG. 14, a modular element 310 includes a base 311 of parallelopiped shape having a plurality of orthogonal, exterior surfaces 312. A plurality of rib pairs 313 extend from each of the exterior surfaces 312 and are in turn separated to define therebetween a groove 314 having a transverse width substantially equal to the transverse width of each rib pair 313.

In FIG. 15, a modular element 320 (similar to the modular element 300 in FIG. 13) is illustrated and includes a base 321 of parallelopiped shape having a plurality of orthogonal, exterior surfaces 322. First and second ribs 323, 324 extend from each of the surfaces 322 and define therebetween a groove 325 having a transverse width substantially equal to that of a rib pair such as pairs 374 in FIG. 10. Contrasted with modular element 300 in FIG. 16, modular element 320 has the ribs 323, 324 closely adjacent the longitudinally-extending edges of surfaces 322.

In FIG. 16, a modular element 330 includes a base 331 having first and second, parallel surfaces 332A, 332B. First and second ribs 333A, 334A, and 333B, 334B, extend, respectively, from first and second surfaces 332A, 332B and define therebetween respective grooves 335A, 335B, each having a transverse width substantially equal to that of a rib pair such as rib pair 274 in FIG. 10. In addition, the ribs 333A, 333B, and 334A, 334B, are aligned with each other and have common side surfaces 336, 337. The transverse dimension of modular element 330 from the tip of rib 333A to the tip of rib 333B along surface 336 (and the corresponding transverse dimension from the tip of rib 334A to the tip of rib 334B along surface 337) is equal to the transverse width of a rib such as rib pair 274 in FIG. 10. Accordingly, the modular element 330 can be mated with a modular element such as element 272 in FIG. 10 by frictional engagement with either a rib pair or a groove between adjacent rib pairs thereof.

Finally, in FIG. 17, a modular element 340 includes a base 341 having a first surface 342 and first and second ribs 343, 344 which extend from the first surface 342 and define therebetween a groove 345 whose transverse width is substantially equal to that of a rib pair. Extending from a second surface 346 of base 341 is a single rib pair 347.

FIG. 18 illustrates two additional orientations of mating modular elements constructed according to the teachings of the present invention. First and second modular elements 350, 360 are seen in assembly with a third modular element 370. The modular element 350 has a base 351 and a plurality of rib pairs 352 and a transverse dimension G from the tip of each rib pair 352 to the bottom of the base 351. The modular element 370 likewise has a base 371 and a plurality of rib pairs 372, with a groove 373 being defined between the ribs of each pair and a groove 374 being defined between adjacent rib pairs. Accordingly, if the transverse dimension G is substantially equal to the transverse width D (FIG. 3) of each groove 374, a single rib of a rib pair 352 will fit into one of the grooves 374 if the base 351 is cut or otherwise terminated closely adjacent that rib.

The modular element 360 includes a base 361 having a transverse dimension F. If the transverse dimension F is substantially equal to the transverse width B (FIG. 3) between adjacent ribs 372A, 372B of the rib pair 372, then the base 361 will fit into one of the grooves 373 of modular element 370. Therefore, for modular elements constructed according to the teachings of the present invention, where n equals 1, three orientations of mating modular elements in face-to-face contact are provided and two orientations of the modular elements in end-to-face contact are provided.

Figure 20:
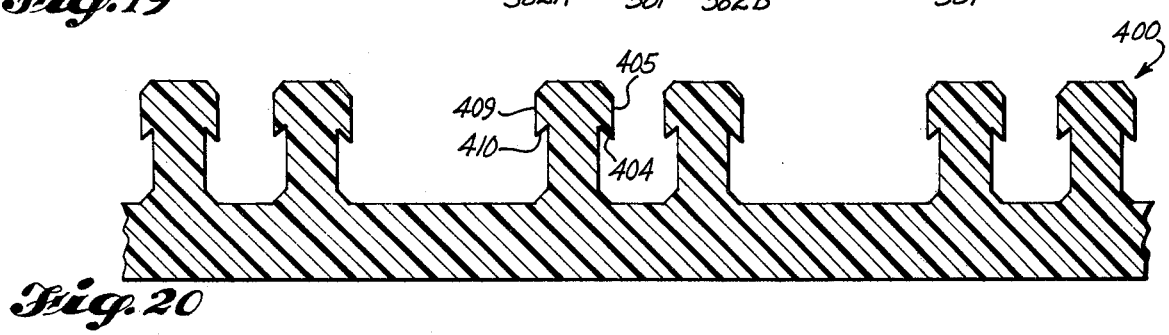
FIG. 20 is a cross-sectional view illustrating a seventh rib design for a modular element and allowing a permanent locking fit.

The rib designs previously discussed have provided either for a disconnectable fit or for a semi-permanent locking fit. In FIGS. 19 and 20, two additional rib designs are illustrated which provide for a permanent locking fit between mating modular elements. In FIG. 19, a modular element 380 includes a base 381 having a surface 381 from which extend a plurality of rib pairs 382. Each rib pair 382 is substantially similar to the rib pair 262 in the rib design illustrated in FIG. 9 and thus includes identical first and second ribs 382A, 382B.

Each rib 382A, 382B has an inner side surface 383, and an adjoining undercut surface 384, a side surface 385, a first chamfer 386, a top surface 387, a second chamfer 388, a side surface 389, a second undercut surface 390, and an outer side surface 391 thereby defining lower indented rib portions and upper expanded rib portions as previously described. However, the first and second undercut surfaces 384, 390 are inclined from respective side surfaces 385, 389, by an angle of substantially 90° or greater. FIG. 19 illustrates a 90° angle for the undercut surfaces 384, 390. In FIG. 20, a modular element 400 has corresponding undercut surfaces 404, 410 which are inclined from respective side surfaces 405, 409 by an angle of 135°. In both cases, the undercut surfaces of adjacent ribs lock with each other upon assembly of mating modular elements to prevent disassembly thereof.

While the invention has been described with respect to a preferred embodiment, it is to be understood by those skilled in the art that the invention is not limited thereto, but rather is to be interpreted only in accordance with the appended claims.

What is claimed is:

1. A matable modular element for use in constructing toys, graphic displays, and structural models, said matable modular element comprising a base having a base surface, and a plurality of parallel rib pairs protruding from and coterminous with said base surface, each said rib pair including first and second, parallel ribs which extend longitudinally and continually along said base surface and which are transversely spaced from each other to define a first groove therebetween, with said plurality of rib pairs also being transversely spaced from each other and adjoining ones of said plurality of rib pairs defining therebetween a second groove, and wherein each said first and each said second rib has a width A in a direction transverse to the longitudinal extension thereof, wherein each said first groove has a transverse width B, where B is substantially equal to nA, wherein n equals 1, 2, 3, . . . , wherein each said rib pair has a transverse width C, where C is substantially equal to (2+n)A, and wherein each said second groove has a transverse width D, where D substantially equal to C.

2. A matable modular element as recited in claim 1, wherein said first and said second ribs of each said rib pair are identical in configuration when viewed in a direction transverse to the longitudinal extension thereof.

3. A matable modular element as recited in claim 1, wherein said first and said second ribs of each said rib pair are mirror images of each other when viewed in a direction transverse to the longitudinal extension thereof.

4. A matable modular element as recited in claim 1, wherein said base surface is substantially planar.

5. A matable modular element as recited in claim 1, wherein said base surface is substantially non-planar.

6. A matable modular element as recited in claim 1, wherein $n = 1$.

7. A matable modular element as recited in claim 6, wherein said base surface is substantially planar, said base further having a second, substantially planar surface separated from but substantially parallel to said base surface, and wherein said base has a transverse height F substantially equal to said transverse width B to permit a base of one said matable modular element to be inserted into a first groove of another said matable modular element in end-to-face contact thereof.

8. A matable modular element as recited in claim 6, wherein said base surface is substantially planar, said base having a second, substantially planar surface separated from but substantially parallel to said base surface, wherein each said first and each said second ribs have tips which are equally spaced from said base surface, and wherein said matable modular element has a transverse height G from said tips to said second surface which is substantially equal to said transverse width D to permit one said matable modular element to be inserted into a second groove of another said matable modular element in end-to-face contact.

9. A matable modular element as recited in claim 1, wherein said base includes a second surface spaced from said base surface, and further including a plurality of second rib pairs protruding from and coterminous with said second surface, said plurality of second rib pairs being configured and spaced from each other in a manner identical to the configuration and spaced of said plurality of rib pairs protruding from said base surface.

10. A modular element for use in interconnecting a plurality of matable modular elements as recited in claim 1, said modular element comprising a body having a plurality of exterior surfaces, each of said exterior surfaces being substantially planar, and at least one rib pair protruding from and coterminous with each of said exterior surfaces, each said one rib pair being identical in configuration to the rib pairs protruding from the base surfaces of the matable modular elements.

11. A modular element as recited in claim 10, wherein adjoining ones of said plurality of exterior surfaces are orthogonal to each other.

12. A modular element as recited in claim 11, wherein said body comprises a parallelopiped having four said exterior surfaces.

13. A modular element for use in interconnecting a plurality of matable modular elements as recited in claim 1, said modular element comprising a body having a plurality of exterior surfaces, each of said exterior surfaces being substantially planar, and third and fourth ribs protruding from and coterminous with each of said exterior surfaces, each said third and each said fourth rib being identical in configuration to the ribs of the rib pairs protruding from the base surfaces of the matable modular elements, said third and fourth ribs being transversely spaced from each other to define therebetween a third groove substantially identical in configuration to the second grooves between the rib pairs protruding from the base surfaces of the matable modular elements.

14. A modular element as recited in claim 13, wherein adjoining ones of said plurality of exterior surfaces are orthogonal to each other.

15. A modular element as recited in claim 14, wherein said body comprises a parallelopiped having four said exterior surfaces.

16. A modular element for use in interconnecting matable modular elements as recited in claim 1, said modular element comprising a body having a plurality of exterior surfaces, each of said plurality of exterior surfaces being substantially planar, and third and fourth ribs protruding from and coterminous each of opposing, first and second ones of said plurality of exterior surfaces, each said third and each said fourth rib being identical in configuration to the ribs of the rib pairs protruding from the base surfaces of the matable modular elements, each said third and each said fourth rib being transversely spaced from each other to define therebetween a third groove substantially identical in configuration to the second grooves between the rib pairs protruding from the base surfaces of the matable modular elements.

17. A modular element as recited in claim 16, wherein said first and second ones of said plurality of exterior surfaces longitudinally extend substantially parallel to each other.

18. A modular element as recited in claim 17, wherein each said third and fourth ribs have tips which are equally spaced from said respective first and second ones of said plurality of exterior surfaces, and wherein said modular element has a transverse dimension from said tips of said third and fourth ribs protruding from said first one of said plurality of exterior surfaces to said tips of said third and fourth ribs protruding from said second one of said plurality of exterior surfaces, which transverse dimension is substantially equal to the transverse width of the second grooves between the rib pairs protruding from the base surfaces of the matable modular elements.

19. A modular element for use in interconnecting matable modular elements as recited in claim 1, said modular element comprising a body having a plurality of exterior surfaces, each of said plurality of exterior surfaces being substantially planar, at least one rib pair portruding from and coterminous with one of said plurality of exterior surfaces, said at least one rib pair being identical in configuration to the rib pairs protruding from the base surfaces of the matable modular elements, and third and fourth ribs protruding from and coterminous with a second one of said plurality of exterior surfaces, said third and fourth ribs being identical in configuration to the ribs of the rib pairs protruding from the base surfaces of the matable modular elements and being transversely spaced from each other to define therebetween a groove substantially identical in configuration to the second grooves between the rib pairs protruding from the base surfaces of the matable modular elements.

20. A matable modular element as recited in claim 1, wherein each said first and each said second rib has a lower, indented portion adjacent said base surface and an upper, expanded portion integral with said lower, indented portion, for providing an interlocking fit upon mating of first and second said matable modular elements.

21. A matable modular element as recited in claim 20, wherein said lower indented portion of each said first and second rib is defined by a pair of side surfaces extending from and adjoining said base surface, and wherein said upper, expanded portion is defined by a substantially cylindrical upper surface adjoining said pair of side surfaces.

22. A matable modular element as recited in claim 21, wherein each of said pair of side surfaces is substantially planar, and wherein said side surfaces longitudinally extend substantially parallel to each other.

23. A matable modular element as recited in claim 20, wherein said lower, indented portion of each said first and said second ribs is defined in part by a pair of first side surfaces extending from and adjoining said base surface, and wherein said upper, expanded portion is defined in part by a pair of undercut surfaces, each extending from an adjoining one of said pair of first side surfaces, a pair of second side surfaces each adjoining and extending from one of said pair of undercut surfaces, and a top surface joining said pair of second side surfaces.

24. A matable modular element as recited in claim 23, wherein said pair of first side surfaces, said pair of undercut surfaces, said pair of second side surfaces, and said top surface are each substantially planar.

25. A matable modular element as recited in claim 24, wherein said first and second side surfaces longitudinally extend substantially parallel to each other.

26. A matable modular element as recited in claim 25, wherein said pair of undercut surfaces are respectively inclined from said pair of second side surfaces by an angle of at least 30°.

27. A matable modular element as recited in claim 26, wherein said angle is 45°.

28. A matable modular element as recited in claim 26, wherein said angle is at least 90°.

29. A matable modular element as recited in claim 28, wherein said angle is 135°.

30. A matable element as recited in claim 23, further comprising first and second chamfer surfaces adjoining said top surface and respective ones of said pair of second side surfaces.

31. A matable modular element as recited in claim 30, wherein said first and second chamfer surfaces are inclined from said top surface by an angle of at least 30°.

32. A matable modular element as recited in claim 31, wherein said angle is 45°.

33. A matable modular element as recited in claim 1, wherein each said first and said second rib includes a lower recess facing said second groove and adjoining said base surface, and an upper projection facing said second groove and adjoining said lower recess for providing an interlocking fit upon mating of first and second said matable modular elements.

34. A matable modular element as recited in claim 33, wherein each said first and said second rib has a concave surface extending from and adjoining said base surface, a convex surface extending from and adjoining said concave surface, a top surface extending from and adjoining said convex surface, and a side surface adjoining said top surface and said base surface and facing said first groove, said concave and said side surface defining said lower recess and said convex surface, said top surface and said side surface defining said upper projection.

35. A matable modular element as recited in claim 33, wherein each said first and said second rib has a first outer side surface extending from and adjoining said base surface, an undercut surface extending from and adjoining said outer side surface, a second outer side surface extending from and adjoining said undercut surface, a top surface extending from and adjoining said second outer side surface, and an inner surface adjoining said top surface and said base surface and facing said first groove, said first outer side surface and said inner surface defining said lower recess and said undercut surface, said second outer side surface, said top surface and said inner surface defining said upper projection.

36. A matable modular element as recited in claim 35, wherein said first and second outer side surfaces, said inner side surface, said top surface and said undercut surface are each substantially planar.

37. A matable modular element as recited in claim 36, wherein said first and second outer side surfaces and said inner surface longitudinally extend substantially parallel to each other.

38. A matable modular element as recited in claim 36, wherein said undercut surface is inclined from said second outer side surface by an angle of at least 30°.

39. A matable modular element as recited in claim 38, wherein said angle is 45°.

40. A matable modular element as recited in claim 38, wherein said angle is at least 90°.

41. A matable modular element as recited in claim 40, wherein said angle is 135°.

42. A matable modular element as recited in claim 35, wherein each said first and each said second rib further comprises a chamfer surface adjoining said top surface and said second outer side surface.

43. A matable modular element as recited in claim 42, wherein said chamfer surface is inclined from said top surface by an angle of at least 30°.

44. A matable modular element as recited in claim 43, wherein said angle is 45°.

45. A matable modular element as recited in claim 35, wherein each said first and each said second rib further comprise a chamfer surface adjoining said top surface and said inner side surface.

46. A matable modular element as recited in claim 45, wherein said chamfer surface is inclined from said top surface by an angle of at least 30°.

47. A matable modular element as recited in claim 1, wherein each said first and said second rib has a first side surface extending from and adjoining said base surface and facing said second groove, a second side surface extending from and adjoining said base surface and facing said first groove, and a top surface adjoining said first and said second side surfaces, each of said first and said second side surfaces being substantially planar, said second side surface being substantially perpendicular to said base surface, and said first side surface being slightly inclined from a perpendicular to said base surface to provide a disconnectable fit between first and second matable modular elements.

48. A matable modular element as recited in claim 47, wherein said first side surface is inclined from a perpendicular to said base surface by an angle of substantially 3°.

* * * * *

UNITED STATES PATENT AND TRADEMARK OFFICE
CERTIFICATE OF CORRECTION

PATENT NO. : 4,147,007
DATED : April 3, 1979
INVENTOR(S) : Helmut Eppich

It is certified that error appears in the above-identified patent and that said Letters Patent are hereby corrected as shown below:

Column 2, line 15, delete "grphic" and insert --graphic--.
Column 2, line 54, delete "mudular" and insert --modular--.
Column 4, line 27, delete "therebtween" and insert --therebetween--.
Column 10, line 21 (Claim 9), delete "spaced" and insert --spacing--.
Column 10, line 63 (Claim 16), after "coterminous" insert --with--.
Column 11, line 28 (Claim 19), delete "portruding" and insert --protruding--.
Column 12, line 21 (Claim 30), after "matable" insert --modular--.

Signed and Sealed this

Fourteenth Day of August 1979

[SEAL]

Attest:

*Attesting Officer*

LUTRELLE F. PARKER
*Acting Commissioner of Patents and Trademarks*